J. H. APJOHN.
CHANGE SPEED GEARING.
APPLICATION FILED AUG. 15, 1908.

945,836.

Patented Jan. 11, 1910.
3 SHEETS—SHEET 1.

WITNESSES:
Edw. D. Spring.
W. P. Burke

INVENTOR
James Henry Apjohn,
By Wm Wallace White
ATTY.

J. H. APJOHN.
CHANGE SPEED GEARING.
APPLICATION FILED AUG. 15, 1908.

945,836.

Patented Jan. 11, 1910.
3 SHEETS—SHEET 2.

WITNESSES:
Edw. D. Spring.
W. P. Burke

INVENTOR
James Henry Apjohn,
By Wm Wallace White
ATTY.

J. H. APJOHN.
CHANGE SPEED GEARING.
APPLICATION FILED AUG. 15, 1908.

945,836.

Patented Jan. 11, 1910.
3 SHEETS—SHEET 3.

WITNESSES:
Edw. D. Spring.
W. P. Burke

INVENTOR
James Henry Apjohn,
By Wm Wallace White
ATTY.

UNITED STATES PATENT OFFICE.

JAMES HENRY APJOHN, OF LONDON, ENGLAND.

CHANGE-SPEED GEARING.

945,836.

Specification of Letters Patent. Patented Jan. 11, 1910.

Application filed August 15, 1908. Serial No. 448,727.

*To all whom it may concern:*

Be it known that I, JAMES HENRY APJOHN, a subject of the King of Great Britain and Ireland, residing at 17 Victoria street, London, S. W., England, have invented certain new and useful Improvements in Change-Speed Gearing, of which the following is a specification.

This invention for improvements in change speed gearing relates to gears of that type in which the driver part of a clutch or gearing is connected to the driven part so that the two can be clutched together or the driven part be allowed to slip back intermittently on the driver part to give any desired reduction of gear.

Figure 1:
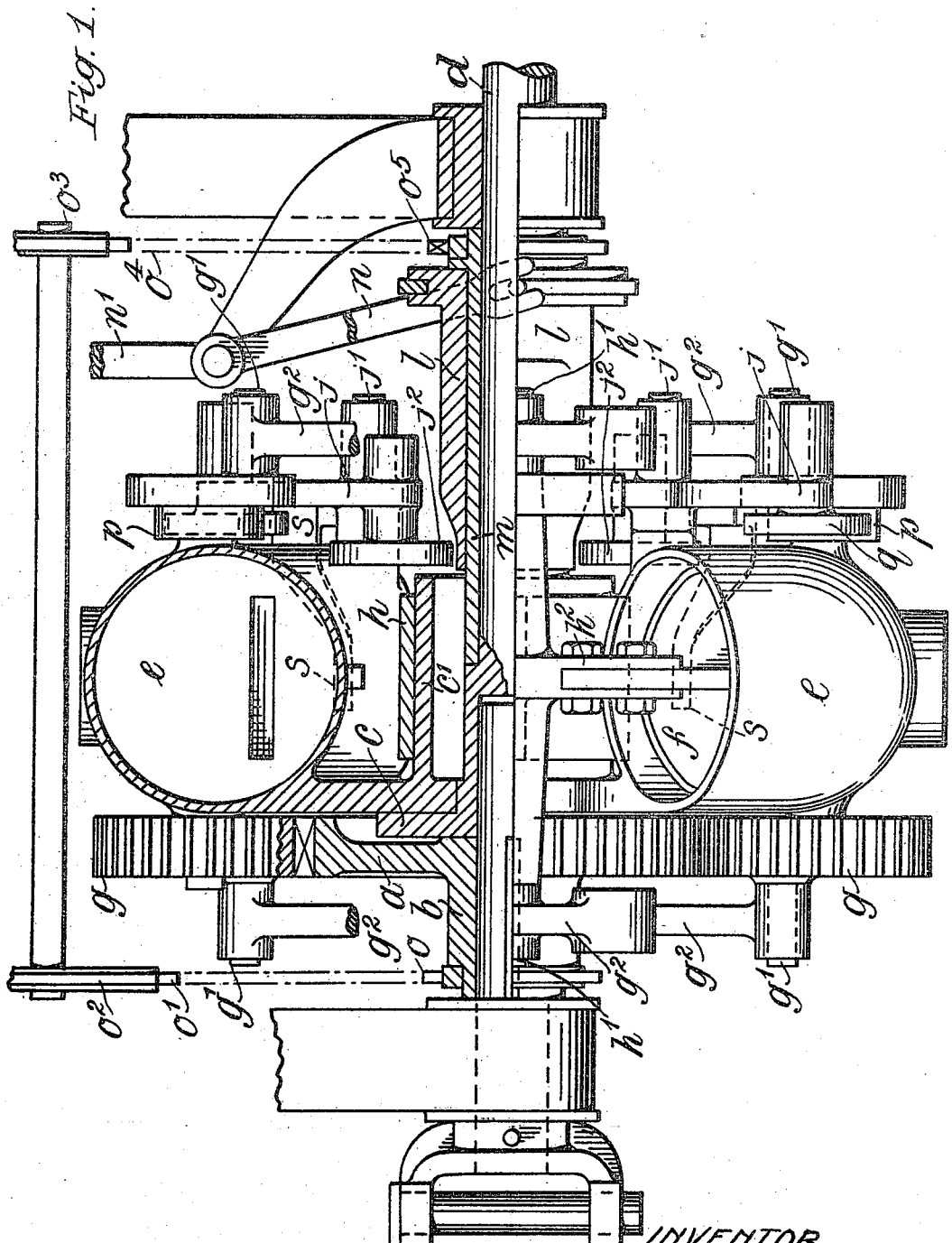
Figure 2:
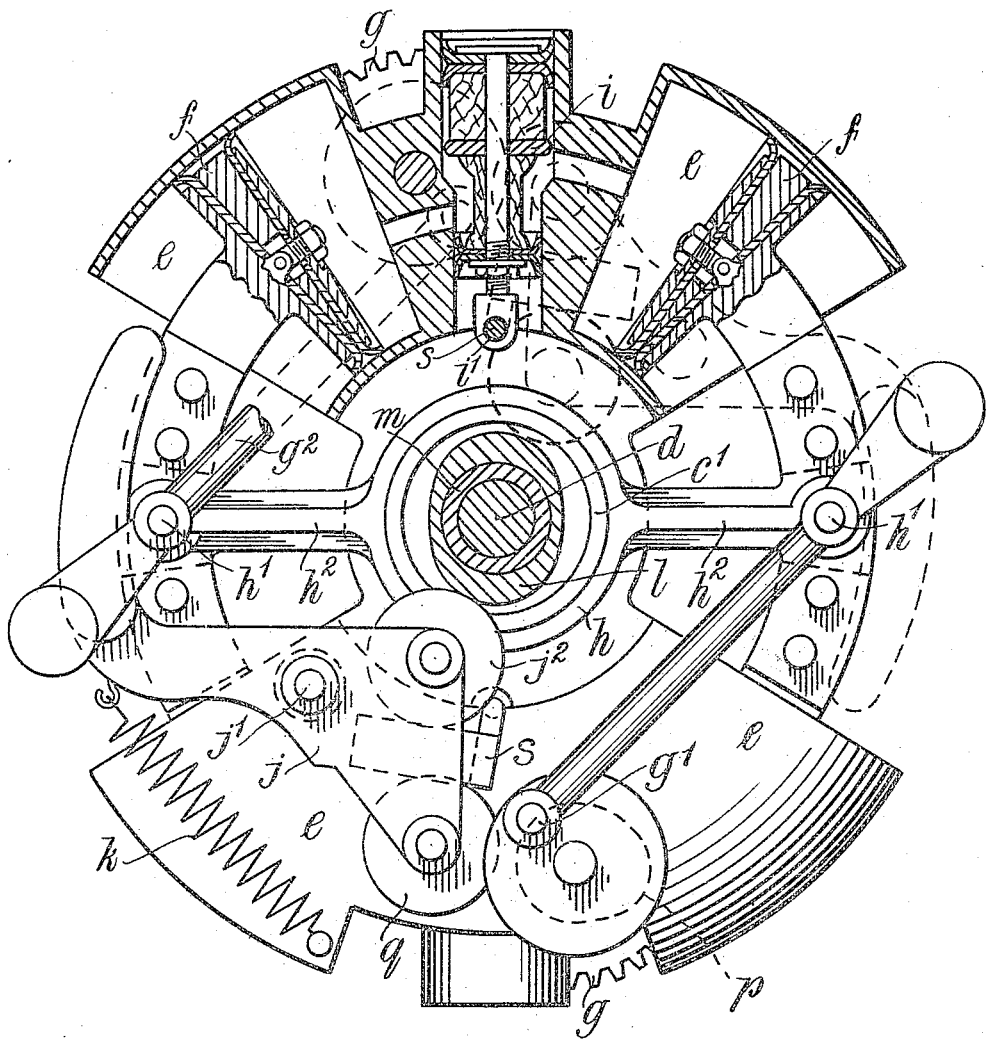
Figure 3:
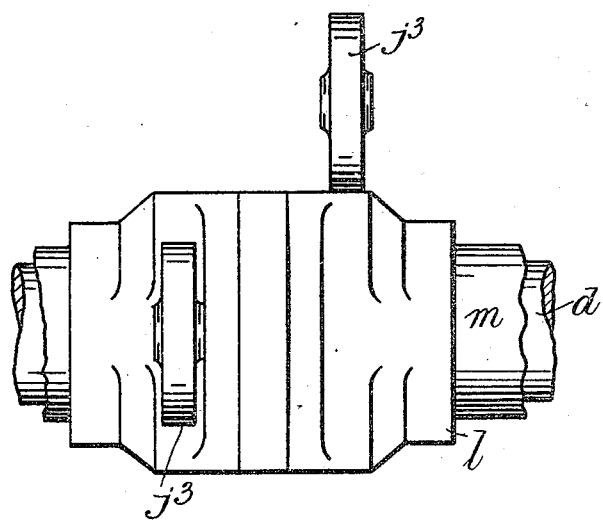
Figure 4:
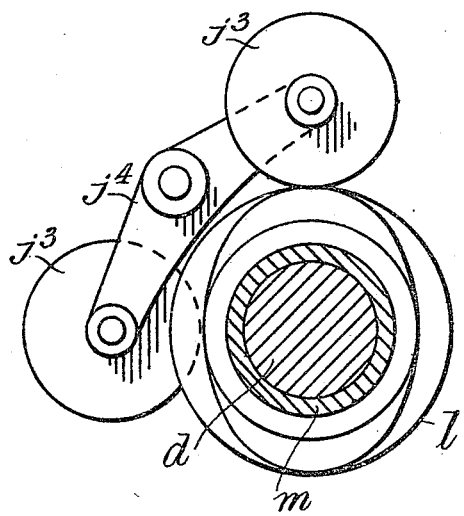

In the accompanying sheet of illustrative drawings Figure 1 is a sectional side elevation of a gearing constructed according to this invention, with the valve operating cam shown in its outermost position for clearness. Fig. 2 is a sectional end elevation of the gearing. Figs. 3 and 4 are diagrammatic views showing in side and end elevation respectively a slightly modified form of valve operating cam.

Now according to this invention a gear wheel $a$ is keyed on the shaft $b$ of the driver and free to revolve on this shaft is a wheel or disk $c$ close to the above gear wheel. The latter wheel or disk $c$ has a boss which is formed in one with the driven shaft $d$. The perimeter of the driven wheel or disk $c$ carries four circumferentially bored cylinders $e$ placed symmetrically and each provided with a piston $f$ and arranged in pairs back to back. The driven wheel or disk besides the cylinders carries two pinions $g$ placed symmetrically to balance each other and these pinions $g$ gear with the wheel $a$ keyed on the shaft $b$ of the driver. A rocker $h$ is concentrically journaled on a sleeve $c'$ and is given a rocking motion as the pinions $g$ turn each pinion having crank pins $g'$ with connecting rods $g^2$ which connect it to a pin $h'$ on the rocker $h$. The rocker $h$ carries arms $h^2$ of an appropriate shape which arms are bolted to suitable projections on the pistons $f$ causing the latter to have reciprocating motion in the cylinders $e$ as the pinions revolve. In the bottom of each cylinder $e$ or in other words between each pair of cylinders is a valve $i$ and when this valve is closed the pistons $f$ cannot be driven home in the cylinders beyond a certain point without the driven wheel or disk $c$ carrying the cylinders $e$ being caused to revolve this point being that at which the product of the difference of pressure in the cylinders and that of the atmosphere with the sum of the piston areas is equal to the torque required for the drive at a radius from the center equal to that of the axes of the cylinders. While the valves $i$ are open the only resistance to the pistons $f$ reciprocating is the friction of the machine so that the driver thereby causes the pistons $f$ to work in the cylinders $e$ without movement being imparted to the wheel or disk $c$ carrying them. When the valves $i$ are closed the driven wheel or disk $c$ must revolve with the same velocity as the driver so long as the area of the cylinders $e$ is sufficiently great to prevent reciprocating motion of the pistons. By having the cylinders in pairs the air in one being compressed and in the other exhausted and making the valve $i$ communicate between these cylinders instead of opening to the air, noise is prevented. Also by making the cylinder curved concentrically friction is reduced and space economized.

If instead of the valves $i$ being the whole time open or closed they are closed for part of a revolution of the driven part and open for the remainder then for the short period that they are open the pistons $f$ move in the cylinders $e$ with no driving force and the speed of the driven part slackens and the driver moves faster than it. The valve $i$ being again closed the overtaking driver gives a blow to the driven part with a dynamic force equal to the potential energy accumulated in the driver when running free. This blow compresses the air in the cylinders $e$ which instantly expands again, in the act of expanding giving the increased torque to the driven part due to its reduction in speed. The alternate opening and closing of the valves can be effected in several ways. In the arrangement shown in Figs. 1 and 2 of the drawings each valve is provided with a rocking tappet $j$ pivoted at $j'$ and arranged so that they both together open or close the valves $i$. The motion of the tappets $j$ is communicated to the valves $i$ by means of arms or fingers $s$ which are screwed to the back of the tappet plates and enter holes $i'$ in the suitably formed end of the valve stem. The rocking tappets $j$ are each provided with a roller $j^2$ which bears under the influence of a spring $k$ on a double or elliptical cam $l$ and the arrangement is such that when the rollers are pressed away from the center of the gear the valves are opened and they again close as the rollers $j^2$ are allowed to return toward the center. This cam $l$ is arranged to slide on a feather on a sleeve $m$ mounted to revolve on the driven shaft $d$ and in which the driven shaft is free to revolve and this cam $l$ is given motion in the direction of the axis of the shaft $d$ by an appropriate fork $n$ and lever $n'$. The elliptical cam $l$ terminates at each end in circular portions and of different diameters. The diameter of one end of the cam $l$ is such that when the rollers $j^2$ are bearing on it the valves $e$ are open and that of the other end being smaller the valves are allowed to close when the rollers are on it. It will be readily seen that when the roller is on the larger end of the cam $l$ the valves are open and when on the smaller end closed and in any intermediate position they are alternately opened and closed by the cam proper as the driven wheel or disk revolves around the cam or the wheel being at rest the cam revolves. This cam $l$ by appropriate gearing which as shown comprises a chain wheel $o$ on the driving part, chain $o'$, wheels $o^2$, $o^3$, chain $o^4$ and wheel $o^5$ on the revolving sleeve $m$, is made to revolve at about half the speed of the engine. In order to start the driven part it is only necessary by means of the lever $n'$ and fork $n$ to give such motion to the cam $l$ in the direction of its axis as will cause the roller to fall from the larger circular part into a portion of the cam proper and the valves being closed a starting blow is given and revolution of the driven part begins. While the driven part is at rest there will be two impulses given each revolution; but as the driven part gathers speed the relative number of revolutions of the cam $l$ (going in the same direction) diminishes and as the number of impulses diminishes until the driven part revolves at half the speed of the driver or in other words at the same speed as the cam then the valves will cease to be alternately opened and closed and the rollers $j^2$ may be allowed to altogether leave the cam proper and rest on the small circular part when all parts will be running together at the same speed.

Should the valves $i$ be closed when the pistons were on the reverse stroke a back blow would be given tending to start the machine in the wrong direction. To prevent this the tappets $j$ are each controlled by an additional cam $p$ which is conveniently placed on the shaft of the pinions $g$ which cam $p$ engaging the roller $q$ on the tappets keeps the valves $i$ open on the reverse stroke thus preventing the possibility of a back blow.

The valves and pistons are each provided with double buckets or cups made preferably of "dexine" a new rubber composition which while retaining much of the elasticity of pure rubber is not injuriously affected by oil. In Figs. 3 and 4 of the drawings a slightly modified arrangement of valve operating cam is shown wherein the valves are positively opened and closed. The cam $l$ comprises and is divided into five main portions that in the center being circular and of a diameter corresponding with the major axis of the two elliptical cam portions on either side while the two ends are of a diameter corresponding to the minor axis of the cam portions. The cam is mounted to slide on a sleeve arranged to rotate on the driven shaft as in Figs. 1 and 2 but in this case each rocker carries two rollers $j^3$ mounted at each end of a pivoted link or arm $j^4$ in different planes so that when one of the rollers is on that part of its cam that corresponds with the minor axis of that cam, the other roller will be on its cam, at a point that corresponds with its major axis as shown in the drawings; or in another case when one roller is on the small circular portion the other would be on the large circular portion and vice versa when the cam is shifted to its other extreme position so that the valves are either held positively open and closed at intervals or positively closed as desired.

What I claim and desire to secure by Letters Patent is:—

1. Variable speed gearing consisting of a driver part, a driven part, circumferentially bored and arranged cylinders connected to one part and pistons adapted to work in the cylinders and to be reciprocated from the other part, valves adapted to open and close the cylinders and a rotary gear driven at a different speed to the driver part and operating by its relative difference in speed the opening and closing of the valves.

2. Variable speed gearing consisting of a driver shaft, a gear wheel keyed on the driver shaft, a driven shaft, cylinders supported on the driven shaft, pistons arranged to work in the cylinders and connected in pairs, pinions mounted to revolve on the cylinder support and meshing with the gear wheel on the driver shaft, a rocker operated by the pinions and adapted to impart reciprocating motion to the pistons and valves arranged to put adjacent pairs of cylinders in communication or close them substantially as described.

3. Variable speed gearing consisting of a driver part, a driven part, circumferentially bored and arranged cylinders connected to one part and pistons adapted to work in the cylinders and to be reciprocated from the other part, valves adapted to open and close the cylinders, a rotary gear driven at a different speed to the driver part and operating by its relative difference in speed the opening and closing of the valves, and cam and tappet mechanism arranged to operate the valves.

4. Variable speed gearing consisting of a driver shaft, a gear wheel keyed on the driver shaft a driven shaft, cylinders supported on the driven shaft, pistons arranged to work in the cylinders and connected in pairs, pinions mounted to revolve on the cylinder support and meshing with the gear wheel on the driver shaft, a rocker operated by the pinions and adapted to impart reciprocating motion to the pistons, valves arranged to put adjacent pairs of cylinders in communication or close them, and valve operating mechanism comprising a sleeve mounted on the driven shaft, a cam sliding on the sleeve and driven from the driver shaft, and a forked operating arm or lever engaging the cam to slide it along the sleeve substantially as and for the purpose described.

In testimony whereof I have affixed my signature, in presence of two witnesses.

JAMES HENRY APJOHN.

Witnesses:
 JOHN W. MACKENZIE,
 ALBERT JONES.